(12) United States Patent
Lai

(10) Patent No.: US 8,264,560 B2
(45) Date of Patent: Sep. 11, 2012

(54) IMAGE CAPTURING DEVICE HAVING OBLIQUE IMAGE SENSOR

(75) Inventor: Cheng-Yi Lai, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 353 days.

(21) Appl. No.: 12/755,384

(22) Filed: Apr. 6, 2010

(65) Prior Publication Data

US 2011/0019076 A1    Jan. 27, 2011

(30) Foreign Application Priority Data

Jul. 21, 2009   (CN) .......................... 2009 1 0304576

(51) Int. Cl.
*H04N 5/225*    (2006.01)

(52) U.S. Cl. ...................... 348/219.1; 348/340; 348/375

(58) Field of Classification Search ............... 348/219.1, 348/340, 373–375
See application file for complete search history.

(56) References Cited

U.S. PATENT DOCUMENTS

| 5,649,237 A * | 7/1997 | Okazaki ........................... 396/55 |
| 6,072,529 A * | 6/2000 | Mutze ............................. 348/351 |
| 2006/0098967 A1* | 5/2006 | Togawa ........................... 396/55 |

* cited by examiner

*Primary Examiner* — Tuan Ho
(74) *Attorney, Agent, or Firm* — Altis Law Group, Inc.

(57) ABSTRACT

An image capturing device includes a lens module defining an optical axis, a holder defining an opening and a space communicating with the opening, an image processing unit received in the space, and an image sensor received in the space and fixed on the image processing unit. The holder is configured for receiving the lens module. The image processing unit is electrically connected to the image processing unit and inclined relative to the optical axis. The image sensor is configured for capturing images of objects. The optical axis passes through the center of the sensing surface of image sensor.

11 Claims, 3 Drawing Sheets

IMAGE CAPTURING DEVICE HAVING OBLIQUE IMAGE SENSOR

BACKGROUND

1. Technical Field

The present disclosure relates to imaging technologies and, particularly, to an image capturing device having an obliquely-oriented image sensor.

2. Description of Related Art

An example of an application of image capturing device is optical touch devices. Optical touch devices include an image capturing device and a display. Such devices can detect and interpret a single gesture made by a user. Being only able to detect a single gesture at a time is very limiting. During capturing images of gestures, an object distance of a hand is determined by the image capturing device for accurate focusing to ensure capturing clear images of the gesture. However, the image capturing device can only clearly focus on a single object distance each time. This is inconvenient.

Therefore, what is needed is an image capturing device having an oblique sensor which can overcome above-mentioned problem.

BRIEF DESCRIPTION OF THE DRAWINGS

Many aspects of the present image capturing device can be better understood with reference to the following drawings. The components in the drawings are not necessarily to scale, the emphasis instead being placed upon clearly illustrating the principles of the image capturing device. Moreover, in the drawings, like reference numerals designate corresponding parts throughout the several views.

DETAILED DESCRIPTION

Figure 1:
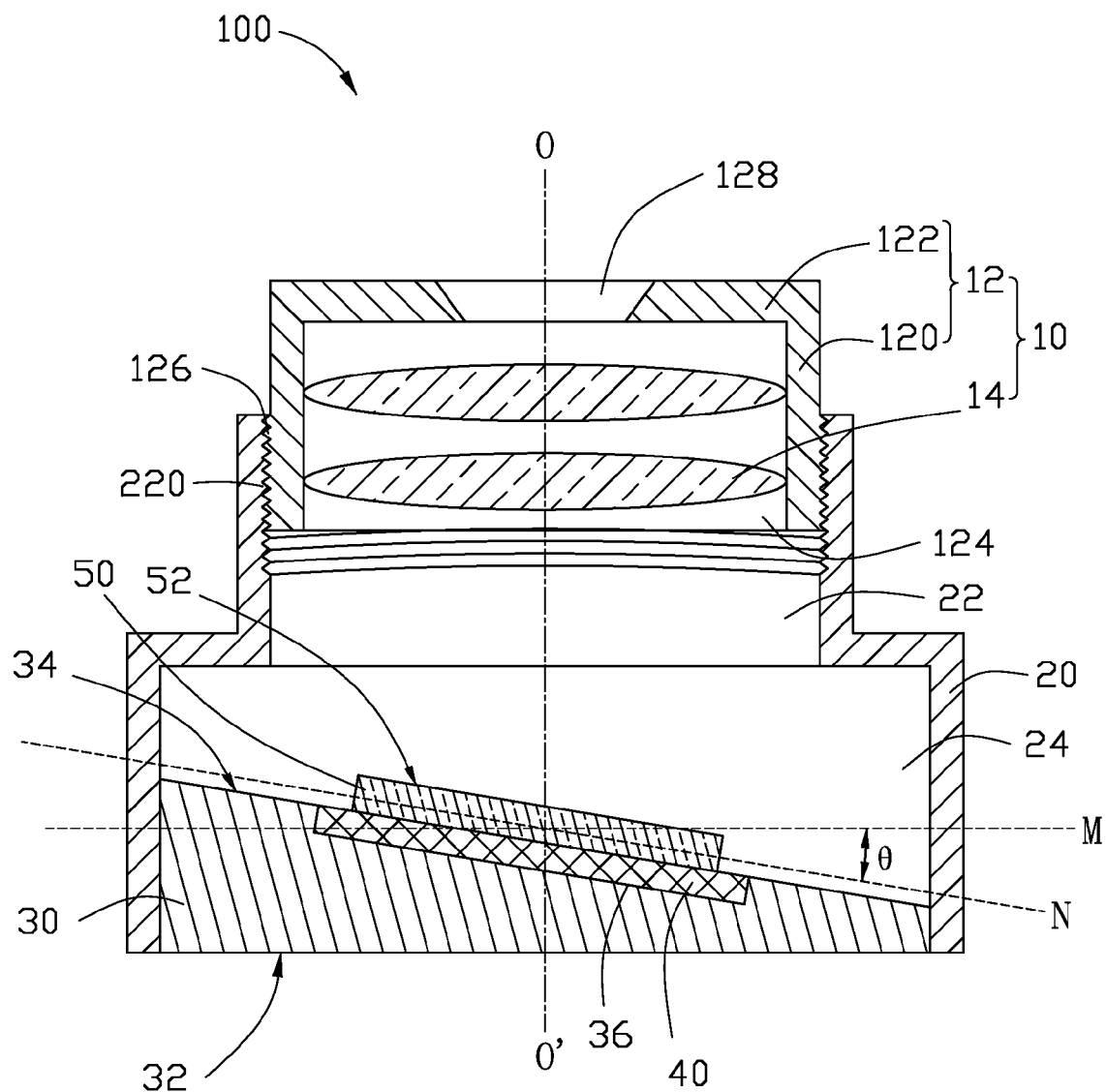
FIG. 1 is a cross-sectional view of an image capturing device, according to a first exemplary embodiment.

Referring to FIG. 1, an image capturing device 100, according to a first exemplary embodiment, includes a lens module 10 having an optical axis OO', a holder 20, a wedge-shape base member 30, an image processing unit 40, and an image sensor 50.

The lens module 10 includes a lens barrel 12 and a lens unit 14. The lens unit 14 is received and fixed in the lens barrel 12. The lens barrel 12 includes a receiving portion 120 and a front portion 122.

The receiving portion 120 has a cylindrical shape and defines a passage 124 therein. The receiving portion 120 has an external thread 126 on an outward circumference thereof. The passage 124 is configured for receiving the lens unit 14 therein.

A cone-shaped hole 128 is defined in the center of the front portion 122 and communicates with the passage 124. A diameter of the hole 128 gradually decreases from the object side to the image side of the lens module 10. Incident light beams passing through the hole 128 can reach into the passage 124 and the lens unit 14.

The lens unit 14 includes two lenses. The lens may be made of, for example, glass or resin and can be aspherical lens or spherical lens. In this embodiment, each lens is made of glass.

The holder 20 defines an opening 22 therein and a space 24 communicating with the passage 124 and the opening 22. An internal thread 220 is formed on sidewalls of the holder 20 in the opening 22. The internal thread 220 engages with the external thread 126 so that the lens module 10 is fixed to the holder 20. In alternative embodiments, the lens module 10 may be fixed to the holder 20 by others means such as with glue or screws.

The base member 30 is received in the space 24. The base member 30 includes a bottom surface 32 and a top surface 34. The bottom surface 32 is a planar surface. The top surface 34 is an inclined plane. A cavity 36 is defined in the top surface 34.

The image processing unit 40 is received in the cavity 36 and inclined towards the bottom surface 32 in accordance with the top surface 34. The image sensor 50 is fixed on the image processing unit 40 in the space 24 and electrically connected to the image processing unit 40, thereby the image sensor 50 is inclined towards the bottom surface 32 in accordance with the top surface 34. The image sensor 50 is configured for capturing images of objects. The optical axis OO' passes through the center of a sensing surface 52 of image sensor 50. A plane M perpendicular to the optical axis OO' is defined. A plane N parallel to the sensing surface 52 of the image sensor 50 is defined. An included angle θ between the plane M and the plane N satisfies the following formulas: $0 \leq \theta \leq 45°$. In this embodiment, the included angle θ is about 30°.

The image sensor 50 is a charge coupled device (CCD) or a complementary metal-oxide semiconductor (CMOS) device. In this embodiment, the image sensor 50 is a CCD. The image processing unit 40 is configured for calculating object distances of a plurality of objects in the target scene according to the captured images.

Figure 2:
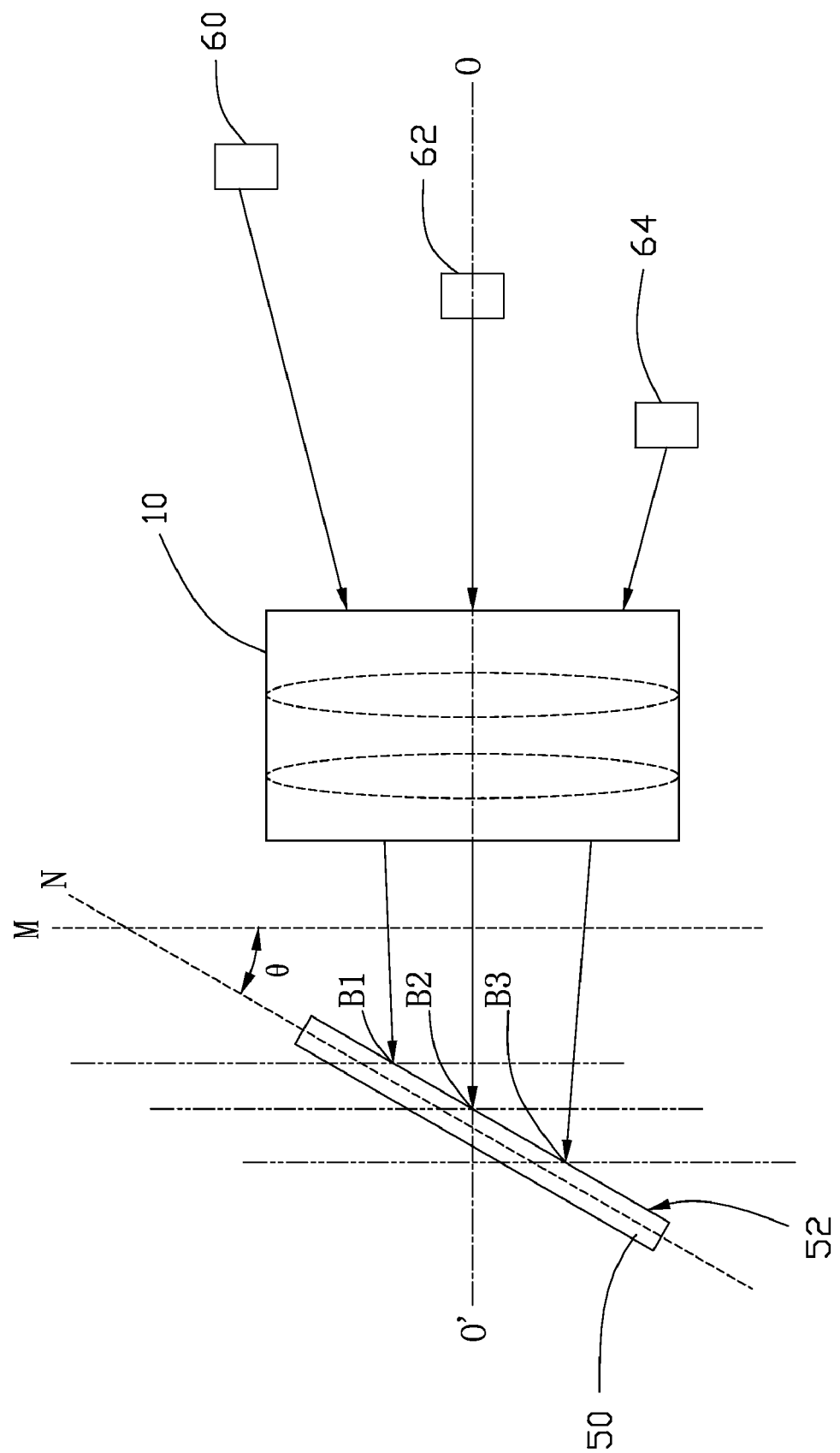
FIG. 2 is a schematic view of a working process of the image capturing device of FIG. 1.

Since the image sensor 50 is oblique to the optical axis OO' of the lens module 10, when the image sensor 50 is positioned at a determined position of the image side of the lens module 10, the sensing surface 52 of the image sensor 50 includes a plurality of imaging strip areas for capturing a plurality of images corresponding to the objects at different object distances (see FIG. 2). In the illustrated example, the plurality of objects includes an object 60 having a first object distance, an object 62 having a second object distance, and an object 64 having a third object distance. The first, second and the third object distances are different from each other and may be predetermined according to the position/orientation of the image sensor 50. When the image capturing device 100 is activated, images of up to three objects 60, 62, 64 can be clearly captured at the imaging strip portions B1, B2, B3 of the sensing surface 52 correspondingly. Such image capture device can be used in for example, an optical touch device. In a same image if three gestures of three respective users are clearly captured using the image sensor, and the users are at different locations relative to the image sensor 50, the gestures could be interpreted/regarded as commands inputted into the optical touch device. If the clear image of the three objects 60, 62, 64 are formed on the three image portions B1, B2, B3, the image capturing device 100 captures clear images of gestures, and three instructions input by hands can be executed by the optical touch device instantly. This is convenient.

Figure 3:
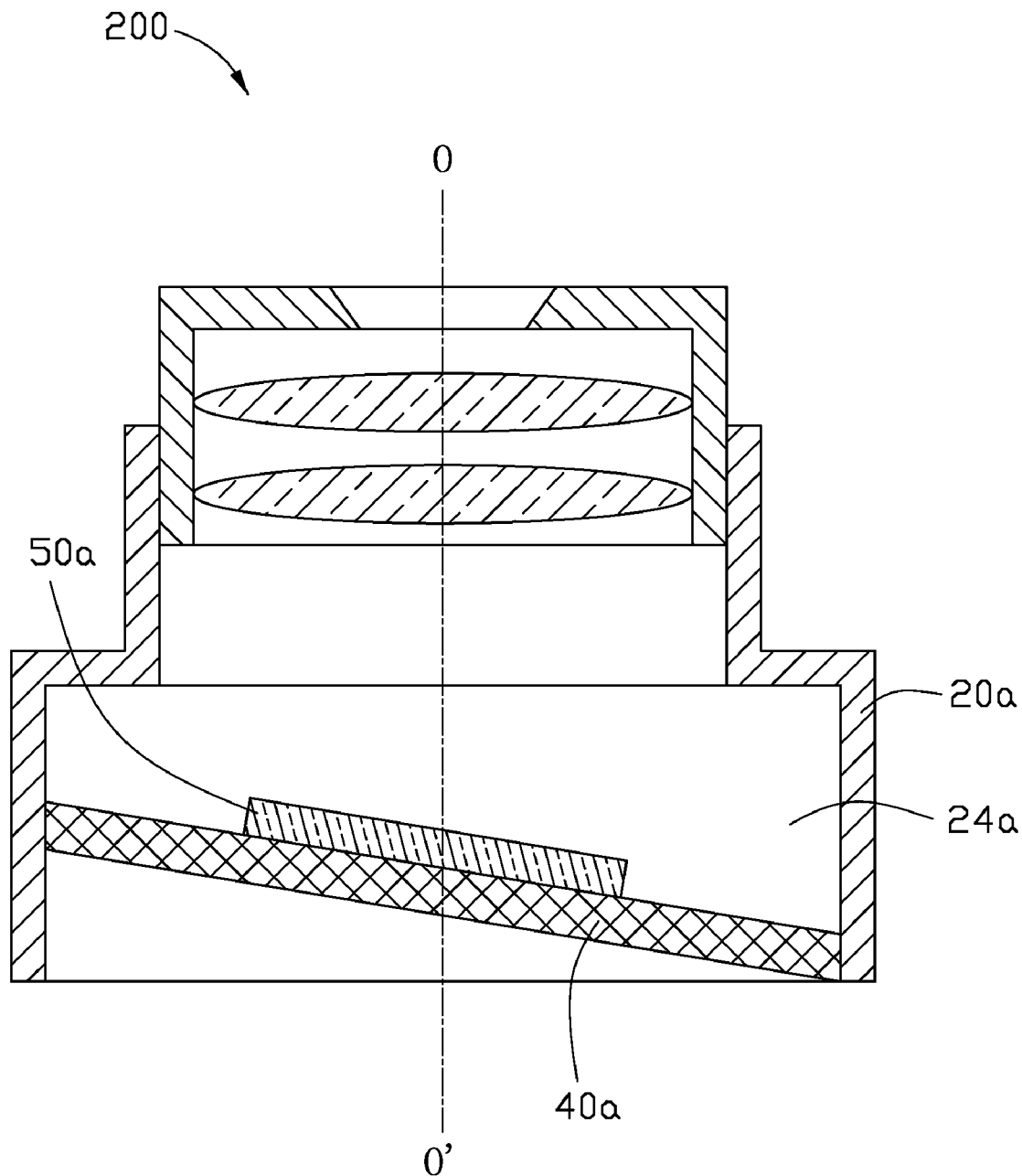
FIG. 3 is a cross-sectional view of an image capturing device, according to a second exemplary embodiment.

Referring to FIG. 3, an image capturing device 200, according to a second exemplary embodiment is shown. The differences between the image capturing device 200 of the embodiment and the image capturing device 100 of the first embodiment are that: the base member is omitted. Instead, an image processing unit 40a is received and mounted to sidewalls of the holder 20a in the space 24a. The image processing unit 40a is inclined relative to the optical axis OO'. The image sensor 50*a* is fixed on the image processing unit 40*a* and is electrically connected to the image processing unit 40*a*. As a result, the image sensor 50*a* is inclined relative to the optical axis OO'.

Advantages of the image capturing device 200 of the second embodiment are similar to those of the image capturing device 100 of the first embodiment.

It is to be understood, however, that even though numerous characteristics and advantages of the present embodiments have been set fourth in the foregoing description, together with details of the structures and functions of the embodiments, the disclosure is illustrative only, and changes may be made in details, especially in matters of shape, size, and arrangement of parts within the principles of the disclosure to the full extent indicated by the broad general meaning of the terms in which the appended claims are expressed.

What is claimed is:

1. An image capturing device, comprising:
   a lens module defining an optical axis;
   a holder defining an opening and a space communicating with the opening, the lens module received in the opening;
   an image processing unit received in the space; and
   an image sensor received in the space and electrically connected to the image processing unit, and inclined relative to the optical axis, the image sensor configured for capturing images of objects, the optical axis passing through the center of a sensing surface of the image sensor.

2. The image capturing device as claimed in claim 1, wherein the lens module comprises a lens barrel and a lens unit, and the lens unit is received and fixed in the lens barrel.

3. The image capturing device as claimed in claim 2, wherein the lens barrel comprises a receiving portion and a front portion connected to the receiving portion; a passage is defined in the receiving portion and configured for receiving the lens unit, a hole is defined in the center of the front portion; the hole is in communication with the passage.

4. The image capturing device as claimed in claim 3, wherein the receiving portion has a cylindrical shape; the hole has a conical shape, a diameter of the hole gradually decreases from the object side to the image side of the lens module.

5. The image capturing device as claimed in claim 4, wherein an external thread is formed on outward circumference of the receiving portion; an internal thread is formed on peripheral sidewalls of the holder in the opening corresponding to the external thread; the internal thread is engaged with the external thread so that the lens module is fixed to the holder.

6. The image capturing device as claimed in claim 4, wherein the lens module is fixed to the holder by glue or screw joint.

7. The image capturing device as claimed in claim 2, wherein lenses of the lens unit are made of glass or resin.

8. The image capturing device as claimed in claim 2, wherein lenses of the lens unit are aspherical lenses or spherical lenses.

9. The image capturing device as claimed in claim 5, wherein the image capturing device further comprises a wedge-shape base member; the base member comprises a bottom surface and a top surface; the bottom surface is a plane; the top surface is an inclined plane and inclined relative to the optical axis; a cavity is defined in the top surface, the image processing unit received in the cavity.

10. The image capturing device as claimed in claim 1, wherein an included angle $\theta$ between the sensing surface of the image sensor and the optical axis satisfies the following formulas: $0 \leq \theta \leq 45°$.

11. The image capturing device as claimed in claim 1, wherein the included angle $\theta$ is about 30°.

* * * * *